Patented June 23, 1942

2,287,590

UNITED STATES PATENT OFFICE 2,287,590

FLUOROARYLAMINOANTHRAQUINONE ACID WOOL DYESTUFFS

Alexander J. Wuertz, Wilmington, Del., Henry R. Lee, Pitman, N. J., and Edwin C. Buxbaum, Swarthmore, Pa., assignors to E. I. du Pont de Nemours & Company, Wilmington, Del., a corporation of Delaware No Drawing. Application May 31, 1940, Serial No. 338,222

5 Claims. (Cl. 260—373)

This invention relates to the preparation of new acid wool dyestuffs of the anthraquinone series and more particularly to the preparation of acid wool dyestuffs of the anthraquinone series which carry fluorine attached through an arylamino radical to the anthraquinone nucleus.

The arylamino-anthraquinone sulfonic acids constitute a well known class of acid wool dyestuffs. Two general types of this general class of dyestuffs are known. One being those in which the sulfonic acid group is attached through an aryl-amino or aryloxy-group to the anthraquinone nucleus and the other in which the sulfonic acid group is attached directly to the anthraquinone nucleus usually in a beta position. The two types of dyestuffs have somewhat different dyeing characteristics although these characteristics may be materially modified by the introduction of other substituents in the molecule. In general the introduction of halogen such as chlorine and bromine in the aryl groups of the bases of these acid wool dyestuffs render the compounds of little value since the resulting acid wool colors are usually dull and, in the main, it is difficult to introduce a sulfonic acid group in the aryl radical when chlorine or bromine is present.

We have found that by producing compounds in which fluorine is directly attached to the aryl radical of an arylamino-anthraquinone, improved acid wool dyestuffs are produced which have increased brightness and, in general, have improved washing, fastness and leveling properties. By the introduction of fluorine in the aryl ring, we have also been able to obtain many new and desirable shades varying quite markedly from the dyestuffs which do not contain fluorine. The production of new shades in this class of known acid wool dyestuffs is an important feature of the invention for there is a constant demand for new colors in this class of dyes for the production of the new shades required in the dyeing of wool, silk, nylon and similar fibers and the introduction of fluorine in the aryl ring of the arylaminoanthraquinone acid wool dyestuffs materially enlarges the range of colors that are available in this class for the dyeing of these fibers.

It is therefore an object of this invention to prepare new acid wool dyestuffs which dye in new and desirable shades. It is a further object of the invention to prepare new acid wool dyestuffs which have improved brightness, fastness and level dyeing properties.

According to this invention the new fluorine-containing acid wool dyestuff may be produced by condensing amino halogen anthraquinones, hydroxy halogen anthraquinones or amino halogen anthraquinone sulfonic acids with arylamines of the benzene series which contain fluorine directly attached to the aryl group. The condensation products are then sulfonated in the usual manner to render them water soluble if a sulfonic acid group is not already present in the anthraquinone nucleus. These products exhibit increased brightness and fastness properties and in many cases show improved level dyeing properties. The compounds which contain the fluorine in the aryl group are readily sulfonated by the usual sulfonation methods employed in the preparation of arylamino-anthraquinone sulfonic acids. The fluorine-containing arylamines may be otherwise unsubstituted or they may contain other substituents such as nitro, hydroxy, alkoxy, sulfo, or mercapto groups, the presence of such groups usually modifying the dyestuff in shade or dyeing properties in the known manner. It will be obvious to those skilled in the art that where the sulfonic acid group is not contained in the anthraquinone nucleus and must be introduced into the aryl radical only those fluoroarylamines can be employed in which a sulfonic acid radical can be introduced. The halogen anthraquinone sulfonic acids which may be employed in the preparation of these new dyestuffs may contain the sulfonic acid group in either of the benzene rings of the anthraquinone nucleus and the anthraquinone nucleus may also carry further substituents of the type often introduced to modify the dyeing characteristics and shade of these dyestuffs.

The condensation of the amino halogen anthraquinones or the hydroxy halogen anthraquinones with the fluoro-arylamines may be effected by any of the usual condensation methods such as in the presence of water, ammonium acetate, and a copper catalyst or by the "dry" condensation method using an excess of the arylamine with anhydrous sodium or potassium acetate or in organic solvents such as nitrobenzene, orthodichlorobenzene, dioxan or similar solvents.

The following examples are given to illustrate the invention. The parts used are by weight:

Example 1

Twelve parts of 1-methylamino-4-bromo-anthraquinone, 10 parts of para-fluoroaniline, three parts of sodium acetate, 15 parts of cellosolve and three tenths part of copper acetate are reacted by heating to 126–128° C. for a period of 12 hours. The color of the reaction mass turns gradually from red to blue. When condensation is complete, the reaction mass is diluted with 50 parts of ethyl alcohol, cooled, diluted and filtered. The crystalline base so obtained is 1-methylamino - 4- (4'- fluoro-anilino) - anthraquinone. It dissolves in organic solvents with a bright greenish-blue color.

Five parts of the base obtained as described are dissolved in 100 parts of sulfuric acid monohydrate and then treated with sufficient 65% oleum to sulfonate the base at room temperature. The dyestuff is isolated by pouring out the sulfuric acid-oleum mixture into a mixture of ice and water so that the temperature of the diluted sulfonation does not rise over 35° C. and the acidity is 10–20%. The precipitated dyestuff which is of a bright violet color is filtered off and washed acid-free with brine. The dried dyestuff in the form of the sodium salt is a blue powder which dyes wool from an acid bath in bright greenish blue shades having good dyeing properties.

Example 2

Ten parts of 1-hydroxy-2:4-dibromo-anthraquinone are reacted with 35 parts of para-fluoraniline, 10 parts of ammonium acetate, 25 parts of water and 0.2 part of copper acetate by refluxing gently at 100–110° C. for 16 hours or until condensation is complete and then diluting with 100 parts of alcohol. The base which comes out in crystalline form is filtered off, washed with alcohol and water and dried. It consists of 1-hydroxy - 2-bromo-4-(4'-fluoro-anilino)-anthraquinone.

When sulfonated and isolated in the usual manner, it dyes wool in very bright purple shades which exhibit good level dyeing properties.

Example 3

Eleven parts of "bromamine acid" (1-amino-4-bromo-anthraquinone-2-sulfonic acid), twelve parts of para-fluoroaniline, one hundred parts of water, four and a half parts sodium carbonate and three-tenths part of copper acetate are heated at reflux temperature of 100–105° C. for a period of three and one-half hours. The mixture is then cooled and filtered at 30° C. The filter cake is redissolved in 500 cc. of water and sufficient animal charcoal added to clarify it. The filtered solution is then salted to the extent of 4% salt. The reprecipitated color is filtered off and dried. From an acid bath, it dyes wool in clear blue shades of excellent fastness to light and exhibits good leveling properties.

Example 4

Thirteen parts of 1-amino-4-bromoanthraquinone are reacted with 10 parts of metafluoroaniline, 60 parts of cellosolve, 10 parts of potassium acetate, 5 parts of potassium carbonate and 0.6 part of copper acetate. The reaction mass is heated to 128° C. and held there for 12 hours. The mixture is cooled to 70° C. and diluted with 120 parts of ethyl alcohol. The precipitated base is filtered off, washed with alcohol and hot water. It consists of 1-amino-4(3'-fluoroanilino)anthraquinone and is a blue powder which dissolves in solvents with a reddish-blue color. When sulfonated by any of the usual methods, a violet colored compound is obtained which dyes wool in violet shades.

In the preparation of fluoroaniline a mixture of the respective ortho, meta and para-isomers are obtained. This commercial mixture or the isolated isomers may be used in place of the meta- and para-isomers employed in the above examples.

We claim:

1. Compounds of the class consisting of 1-amino-4-arylaminoanthraquinones and 1-hydroxy-4-arylaminoanthraquinones in which the arylamino groups are of the benzene series and which carry fluorine directly attached to the aryl ring of the arylamino radical, and their sulfonic acid derivatives.

2. A 1-amino-4-arylaminoanthraquinone sulfonic acid which carries fluorine directly attached to the aryl ring of the arylamino radical, said arylamine group being of the benzene series.

3. 1 - amino-4-p-fluoro-anilino - 2 - anthraquinone sulfonic acid.

4. 1-methylamino-4-p - fluoro - anilinoanthraquinone sulfonic acid which carries the sulfonic acid group in the anilino ring.

5. 1-hydroxy-2-bromo-4-p - fluoro - anilinoanthraquinone sulfonic acid which carries the sulfonic acid group in the anilino ring.

ALEXANDER J. WUERTZ.
HENRY R. LEE.
EDWIN C. BUXBAUM.